June 12, 1928.  1,672,912
E. E. SABIN
MOLDING MACHINE
Filed May 22, 1925  3 Sheets-Sheet 3

INVENTOR
Ernest E. Sabin
By his Attorney,
Nelson W. Howard

Patented June 12, 1928.

1,672,912

UNITED STATES PATENT OFFICE.

ERNEST E. SABIN, OF BEVERLY, MASSACHUSETTS, ASSIGNOR TO UNITED SHOE MACHINERY CORPORATION, OF BOSTON, MASSACHUSETTS, A CORPORATION OF NEW JERSEY.

MOLDING MACHINE.

Application filed May 22, 1925. Serial No. 32,045.

This invention relates to molding machines. As herein exemplified, the invention is embodied in a machine for "molding soles", i. e. for imparting to an outsole approximately the longitudinal and transverse curvatures of the bottom of the shoe upon which the outsole is to be laid.

In an application for Letters Patent of the United States No. 476,659, filed in the name of George E. Warren, June 11, 1921, and assigned to the assignee of the present application, there is disclosed a novel method for effecting standardization of shoe parts and shoemaking operations characterized in one important aspect by providing units of a shoe with positioning surfaces, such as surfaces formed by jig holes, which are used to control the positions of the units both in predetermined relations to various operating instrumentalities and also in predetermined relations to each other in making the shoe by procedure which, for convenience, is frequently termed "jigging" in said application. In practising the method exemplified in that application, a short outsole having a plane rear end and a jig hole located in predetermined relation to said end is molded, as above explained, approximately to fit the bottom of a welted shoe and at the same time is flared somewhat in the shank to facilitate the outsole stitching operation.

In view of the foregoing, it is an object of this invention to provide an improved sole molding machine organization having provision for locating a sole accurately, easily and quickly in standardized predetermined relation to the forms or molds of the machine. In one aspect, the invention aims to provide mechanism especially adapted to locate a short sole, having a straight or plane rear end and a jig hole, in predetermined relation to the forms, although various features of the invention are not so limited.

With these and other objects in view, the present invention, in one important aspect, provides mechanism which engages a sole or other blank at a straight end or other plane surface in its edge or which engages it in a hole, and which preferably engages it both at such an end and in a jig hole as above explained, and then, through power effected relative movement of the engaging members, positions the sole or blank accurately with relation to molding forms. As herein exemplified, the invention is embodied in a sole molding machine having a jig pin constructed and arranged to occupy a predetermined, but preferably adjustable, position with relation to the lower form of the machine and to enter a jig hole in a short outsole while one or more additional sole engaging members are actuated by power to engage the straight or plane end of said sole at opposite sides of its median line and to press against its said end yieldingly so as to orient the sole about the pin and bring the sole into a predetermined angular, lateral and longitudinal position with relation to the forms and then to maintain the sole in such position until the sole has been gripped between the forms.

In the illustrated machine, the lower form comes to rest in sole receiving position out of line with the upper form to facilitate placing a sole on the lower form and, in the use of the machine, the operator is required merely to place the sole on the lower form with the jig pin entering the jig or positioning hole in the sole, no special attention being required to place the sole in its final angular relation to the form, because, upon movement of the form toward sole pressing position, the additional sole engaging member or members automatically adjust the sole into such final position upon the lower form.

The above and other features of the invention, including certain combinations and arrangements of parts, will now be set forth in detail in the following description of the preferred embodiment of the invention, which is illustrated in the accompanying drawings, and will then be particularly pointed out in the appended claims.

The invention is illustrated, by way of example, as embodied in a twin sole molding machine of the type disclosed in United States Letters Patent No. 1,271,315, granted July 2, 1918, on application of John J. Heys, and No. 1,277,769, granted September 3, 1918, on application of William C. Stewart, but the invention is not restricted to use in machines of that particular type.

Figure 2:
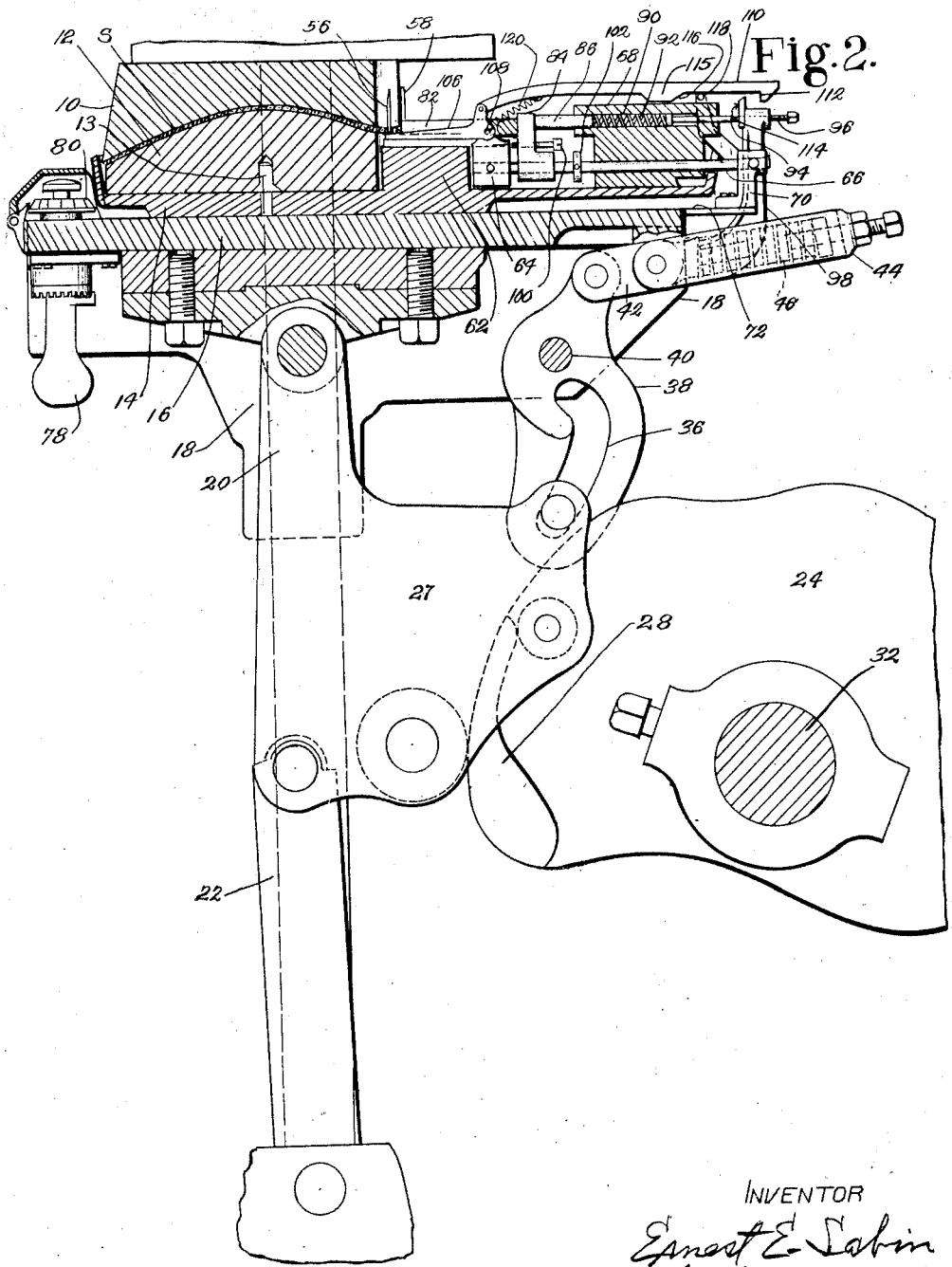
Figs. 2 and 3 are similar views but with the parts shown in different positions in their cycle of operations.
Figure 3:
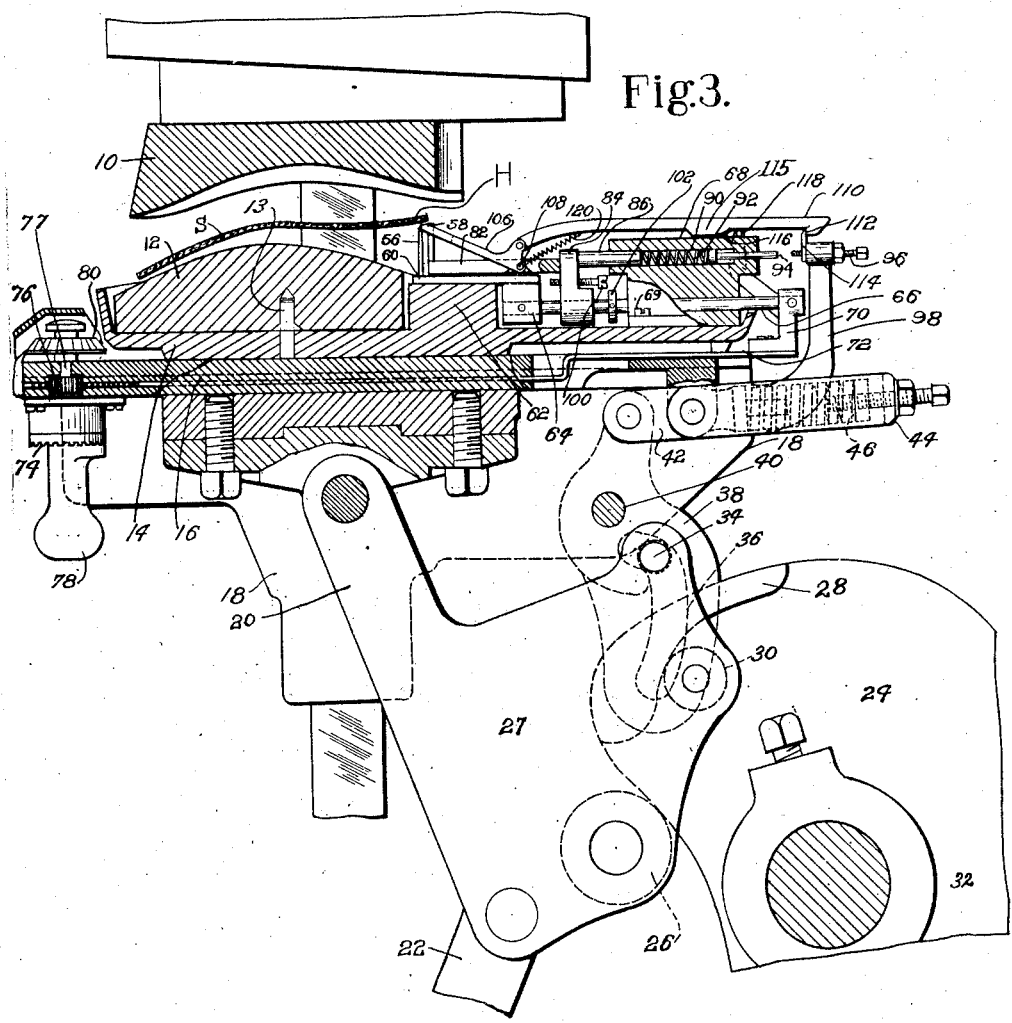
Figure 4:
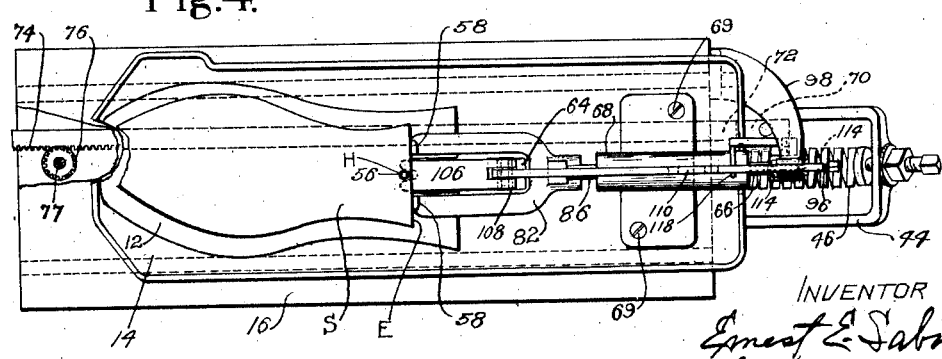
Fig. 4 is a plan view of the parts as shown in Fig. 2 but with the upper form or mold removed.

In the accompanying drawings, the sole S, to be molded as shown for example in Figs. 2 and 3, is shorter than the shoe into which it is to be incorporated and is provided with a straight, or plane, rear end E and with a jig hole H shown, in Fig. 4 especially, as located adjacent to and centrally of the said end E. The molding of the sole is effected by upper and lower molding forms designated 10 and 12 respectively. The lower form is supported in, and positively located by a pin 13 with respect to, a drip pan 14, such as is fully disclosed in United States Letters Patent No. 1,291,880, granted January 21, 1919, on application of John J Heys, and this pin in turn is secured to a slide 16 which moves horizontally in guideways in a crosshead 18 which is moved vertically by a toggle 20, 22 (Fig. 2) by means of a cam plate 24 which engages a cam roll 26 on an extension 27 of the toggle member 20 and by a cam lug 28 which is integral with the cam plate and which engages another cam roll 30 on said extension. The cam plate 24 is secured to rotate with the drive shaft 32 of the machine.

Figure 1:
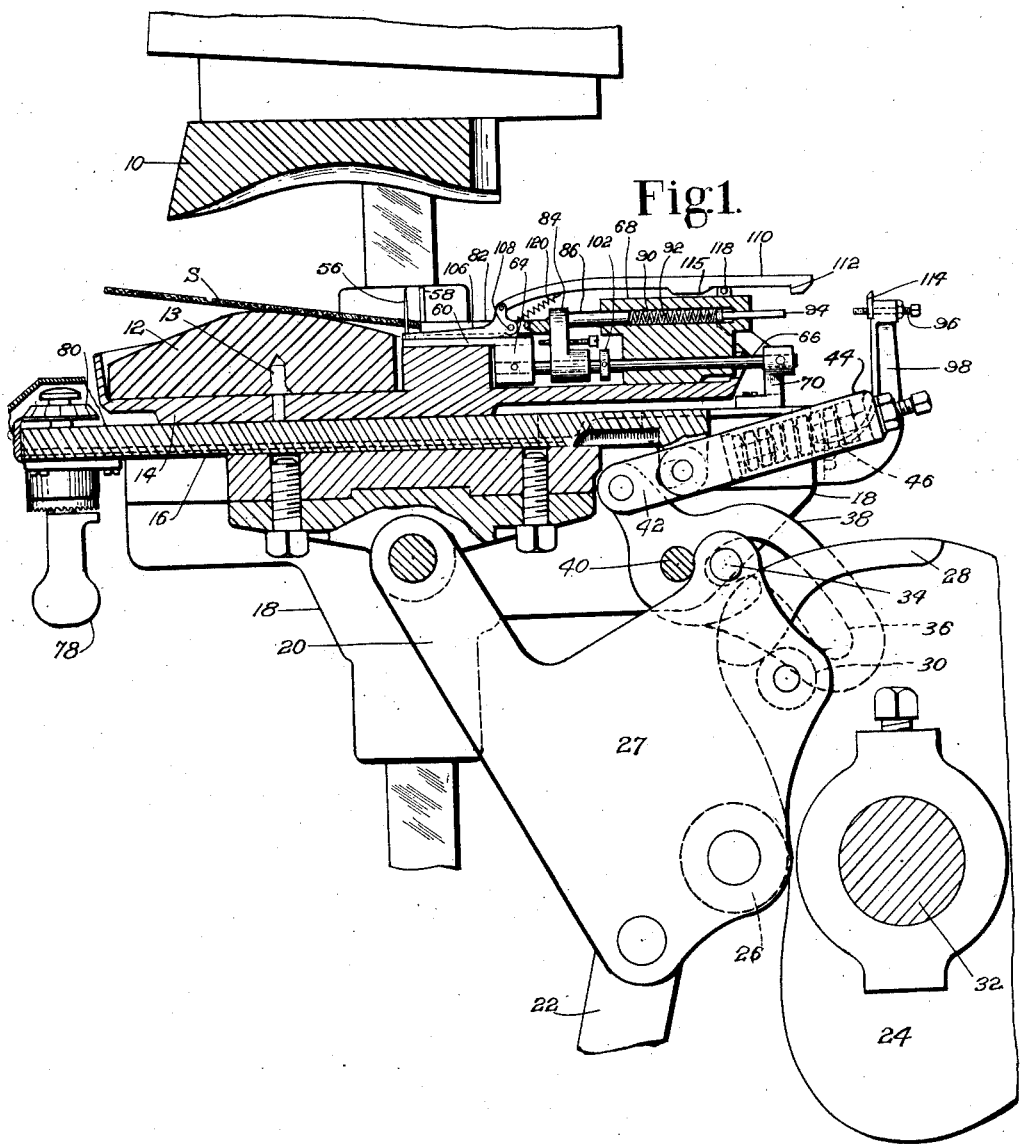
Fig. 1 is a view in longitudinal, sectional elevation of a part of a sole molding machine of a well-known type in which the present invention is embodied.

As is more fully described in the Letters Patent above mentioned, the lower form 12 is moved horizontally from its sole receiving position, illustrated in Fig. 1, into alinement with the upper form 10 and vertically into its sole pressing position, illustrated in Fig. 2, by the toggle mechanism just described and by slide actuating mechanism directly actuated by the toggle mechanism and comprising a pin 34 on the extension 27 which engages a cam slot 36 in a lever 38 pivoted at 40 to the crosshead 18 and connected through links 42, 44 and spring 46 to the slide 16, as set forth in Letters Patent No. 1,277,769, above mentioned. The illustrated outsole locating mechanism comprises a jig pin 56 constructed and arranged to enter the jig hole H in the sole S and to fit it approximately but yet loosely enough to allow the sole to occupy the different positions illustrated in the drawings. This locating mechanism also comprises a pair of members 58 constructed and arranged to engage the rear plane end E of the sole at opposite sides of the longitudinal median line of the sole, as illustrated in Fig. 4.

The jig pin 56 is fixed to a plate 60 resting on and slidable longitudinally over a block 62 formed integral with the pan 14. At its rear end, this plate 60 is provided with a block 64 fixed to a rod 66 slidable through a block 68 also secured by screws 69 to the pan 14. Rod 66 is connected by a bracket 70 to a bar 72 slidable longitudinally in a guideway in the slide 16 and provided at its forward end with rack teeth 74 meshing with a pinion 76 secured to an indicator shaft 77. This shaft is provided at its lower end with an operating handle 78 and at its upper end with a dial 80 having thereon suitable indicating characters for various sizes and styles of soles to be molded, all as more fully explained in Patent No. 1,271,315. above referred to.

The two locating members 58 are fixed to a bifurcated plate 82 which rests on the plate 60 and to the rear end of which is fixed a block 84 mounted to slide upon the rod 66, before mentioned, and provided also with a rearwardly extending rod 86 which slides in a hole 90 in the block 68. The rear end of this rod 86 is arranged to engage the forward end of a coiled compression spring 92 lying in said hole and contacting at its rear end with the headed end of a slidable rod 94 which is arranged to come into engagement with a fixed stop, in the form of a screw 96, as the slide 16 and the parts carried thereby are moved rearwardly to bring the lower form 12 into alinement with the upper form 10. The screw 96 is adjustably mounted in the upper end of a bracket 98 fixed to the crosshead 18. The movement of the block 84 toward and from the block 64 is limited respectively by an adjustable screw 100 threaded through the block 84 and arranged to contact with the block 64 and by an adjustable collar 102 fixed to the rod 66.

For insuring that the sole S shall be lifted from the form 12 and from the jig pin 56 after the molding is completed and as the lower form is moved successively from the position shown in Fig. 2 to that shown in Fig. 3 and finally to that shown in Fig. 1, the machine is provided with a stripper 106 which at its forward end embraces the jig pin 56 and extends beneath the rear end of the sole S, as shown in Fig. 4. This stripper is pivoted at 108 to the block 64 and is actuated by a bar 110 having at its rear end a hook 112 which moves longitudinally with the slide 16 so as to come into engagement, as shown in Fig. 3, with the rear face of an abutment 114 fixed to the bracket 98 before mentioned. The bar 110 is provided with a lug 115 having a cam surface 116 which is engaged by an abutment 118 movable longitudinally with the slide 16 and so constructed and arranged that, as the abutment travels along said cam surface 116 just after the stripper 106 has been raised to the position shown in Fig. 3 by the co-operation of the hook 112 and the abutment 114, the hook and abutment will be disengaged and hence, shortly after the outsole has been stripped from the lower form and from the jig pin, as shown in Fig. 3, a coil spring 120 will return the stripper to its normal position upon the plate 60, as shown in Fig. 1.

While the manner in which the illustrated machine is designed to function has been clearly indicated in the foregoing detailed description of its structural features, the preferred mode of operation of the machine, and particularly of the mechanism for bringing a short outsole of the type illustrated into a predetermined angular, lateral and longitudinal position on the lower form and for maintaining the sole in such position until the sole is gripped between the forms, will now be briefly summarized.

Assuming that the machine is at rest with the parts occupying the relative positions indicated in Fig. 1 and, with the slide 16 in its foremost and lowermost position so as to present the lower form 12 in convenient sole-receiving position, the handle 78 is manipulated to place the jig pin 56 in the proper longitudinal position for locating the ball line of the sole S correctly with respect to the ball line of the lower form 12 for the particular size and style of outsole to be molded, as indicated by the characters upon the dial 80. The attendant then places the sole S upon the lower form 12 with its longitudinal median line lying as nearly as conveniently may be parallel to the longitudinal median line of the form and with the jig hole H of the sole over the jig pin 56, as indicated in Figs. 1 and 4. At this stage in the cycle of operations, the locating members 58 will be in their rearmost position and preferably just out of contact with the rear end E of the sole. The machine is then thrown into operation in the ordinary way and, through the rotation of the main shaft 32, the lower form 12 is brought into alinement with the upper form 10 but just before it reaches that position the rod 94 comes into engagement with the end of the screw 96 so that the block 84 and parts connected therewith, including the members 58, are moved, through the spring 92 yieldingly, forward relatively to the jig pin 56 and the members 58 are pressed against the plane rear end E of the sole and they thus orient the sole about the jig pin 56 to bring the sole definitely into a predetermined angular position on the lower form. Continued rotation of the shaft 32 raises the lower form 12 into sole molding position, as shown in Fig. 2 and then, after the molding of the sole is completed, the form is lowered and carried forward toward the position, shown in Fig. 1, where the sole is to be replaced by an unmolded sole. As the form 12 is carried by slide 16 from the position shown in Fig. 2 through the position shown in Fig. 3, the hook 112 connected to the stripper 106 engages the abutment 114 and shortly thereafter the abutment 118 engages the cam surface 116 so that the molded sole is first stripped from the lower form 12 and from the jig pin 56 and then the stripper is returned by the spring 120 to its normal position, shown in Fig. 1, the sole S falling back upon the lower form, usually with its end E somewhat in advance of the jig pin 56, whereupon the attendant may remove the sole and replace it by an unmolded sole as just described.

Having described my invention, what I claim as new and desire to secure by Letters Patent of the United States is:

1. In a machine of the character described, upper and lower sole molding forms and mechanism for actuating the lower form to bring it into and out of alinement with the upper form and to move it toward and from the upper form, in combination with mechanism for locating on the lower form a short outsole having a jig hole and a plane end, said mechanism comprising a jig pin constructed and arranged to occupy a predetermined position with relation to the lower form and also to enter said jig hole, a pair of locating members, and means for actuating them to press against said plane end and thereby to adjust the sole about said pin and over the lower form to bring the sole into a predetermined angular, lateral and longitudinal position on the form and to maintain the sole in such position until the sole has been brought firmly into engagement with the upper form.

2. In a sole molding machine, a pair of forms and mechanism for relatively actuating the forms to bring them into and out of alinement and to move one toward and from the other, in combination with mechanism for locating transversely of the forms a short outsole having a plane end and a jig hole adjacent to said end, said mechanism comprising a jig pin constructed and arranged to occupy a predetermined but adjustable position with relation to one form and to enter said hole, means for engaging said end at opposite sides of the median line of the sole and for adjusting the sole about said pin to bring the sole into a predetermined angular, lateral and longitudinal position with relation to the forms and to maintain the sole in such position until the sole has been gripped between the forms, and means by which the initial position of said jig pin may be adjusted longitudinally with relation to the forms.

3. In a sole molding machine, a pair of forms and mechanism for relatively actuating the forms to bring them into and out of alinement and to move one toward and from the other, in combination with mechanism for locating transversely of the forms a short outsole having a straight end and a jig hole adjacent to said end, said mechanism comprising a jig pin constructed and arranged to occupy a predetermined position with relation to one form and to enter said hole, means for engaging said end at opposite sides of the median line of the sole, and means for pressing said engaging means yieldingly against said end to bring the sole into a predetermined angular, lateral and longitudinal position with relation to the forms.

4. A sole molding machine having, in combination, an upper form, a lower form, a slide upon which the lower form is mounted and with which it is movable horizontally into and out of alinement with the upper form, a crosshead carrying said slide, mechanism including a toggle and a cam for moving the crosshead vertically and the slide horizontally to carry the lower form from sole receiving position inwardly and upwardly into sole molding position, mechanism for locating on the lower form a short outsole having a plane end and a jig hole adjacent to said end, said mechanism comprising a jig pin constructed and arranged to occupy a predetermined position with relation to the lower form and to enter said hole, a pair of locating members, and yielding means for moving them longitudinally into engagement with said plane end and thereby to adjust the sole about said pin and over the lower form so as to bring the sole into a predetermined angular, lateral and longitudinal position on the form before the sole engages the upper form and then to maintain the sole in such position until it has been firmly gripped between the forms.

5. In a machine of the character described, upper and lower sole molding forms of which the lower is movable from sole receiving to sole pressing position, in combination with mechanism for locating on the lower form a sole having a jig hole and having also a plane surface in its edge, said mechanism comprising a jig pin constructed and arranged to enter said hole, means for engaging said surface at separated points, and means for actuating said engaging means to orient the sole about said pin and with relation to the lower form.

6. In a machine of the character described, a plurality of molding forms relatively movable from blank receiving to blank pressing position, in combination with mechanism for locating relatively to the forms a blank having a jig hole, said mechanism comprising a jig pin constructed and arranged to enter said hole, and means for engaging the blank at a different locality and for orienting the blank about said pin and with relation to the forms.

7. In a machine of the character described, a plurality of molding forms relatively movable from blank receiving to blank pressing position, in combination with a jig pin located in predetermined relation to one of the forms and constructed and arranged to enter a jig hole in a blank and movable means for orienting the blank about said pin.

8. In a machine of the character described, upper and lower sole molding forms of which the lower is movable from sole receiving to sole pressing position, in combination with power actuated mechanism for moving the sole over the lower form, said mechanism being constructed and arranged to locate and maintain the sole in a predetermined position on the lower form until the sole has been firmly gripped between the forms and to remain in sole engaging position throughout the molding operation.

9. In a machine of the character described, upper and lower sole molding forms of which the lower is movable from sole receiving to sole pressing position, in combination with mechanism for locating on the lower form a sole having a jig hole, said mechanism including a jig pin constructed and arranged to enter said hole, and said mechanism being constructed and arranged to maintain the sole in a predetermined position with relation to the lower form until the sole has been firmly gripped between the forms and to remain in sole engaging position throughout the molding operation.

10. In a machine of the character described, molding forms relatively movable from blank receiving to blank pressing position, in combination with mechanism for locating relatively to the forms a blank having a plane surface in its edge, said mechanism including means engaging said surface and a member engaging another portion of the blank.

11. A sole molding machine having, in combination, an upper form, a lower form movable from sole receiving to sole pressing position, mechanism for locating a sole on the lower form including a plurality of relatively movable members, and power actuated means to move them relatively to adjust the sole on the lower form as the latter moves toward sole pressing position.

12. A sole molding machine having, in combination, an upper form, a lower form, a slide upon which the lower form is mounted and with which it is movable from sole receiving to sole pressing position, mechanism for locating a sole on the lower form including a plurality of relatively movable sole gages of which one is fixed with relation to the slide and another is movable longitudinally of the slide, a fixed stop, and cooperating means including a spring actuated by engagement with said stop for adjusting the sole on the lower form as the latter moves toward sole pressing position.

13. In a machine of the character described, the combination of complemental blank molding forms, a member constructed and arranged to lie in a hole in a blank being molded, and means for stripping the blank from said member.

14. In a machine of the character described, the combination of complemental sole molding forms, a pin constructed and arranged to lie in a hole in a sole being molded, a member normally lying adjacent to one face of the sole in the vicinity of said hole, and means for actuating said member to strip the sole from said pin.

15. In a sole molding machine, an upper form, a lower form movable from sole receiving to sole pressing position, in combination with mechanism for locating a sole on the lower form including a plurality of relatively movable sole gages, one of which is fixed and another of which is movable with relation to the lower form, a fixed stop, and co-operating means actuated by engagement with said stop for adjusting the sole on the lower form as the latter moves toward sole pressing position.

16. In a sole molding machine, the combination of an upper form, a lower form, a pin constructed and arranged to lie in a hole near one end of a sole being molded between said forms, a member normally lying below the sole at opposite sides of said pin, and means for actuating said member to lift said sole off the pin and thereafter to return the member to initial position.

17. In a sole molding machine, upper and lower forms of which the lower carrying a sole is movable into and out of alinement with the upper form, in combination with a pin constructed and arranged to lie in the sole being molded, a sole lifting member movable with the lower form, and means controlled by the movement of the lower form for actuating said lifting member including a co-operating, relatively movable latch and abutment and a cam for releasing the latch, after said member has been lifted, to remove the sole from said pin.

In testimony whereof I have signed my name to this specification.

ERNEST E. SABIN.